Aug. 11, 1964 G. C. DAY 3,144,375
ARTIFICIAL TREE
Filed Feb. 24, 1961 2 Sheets-Sheet 1
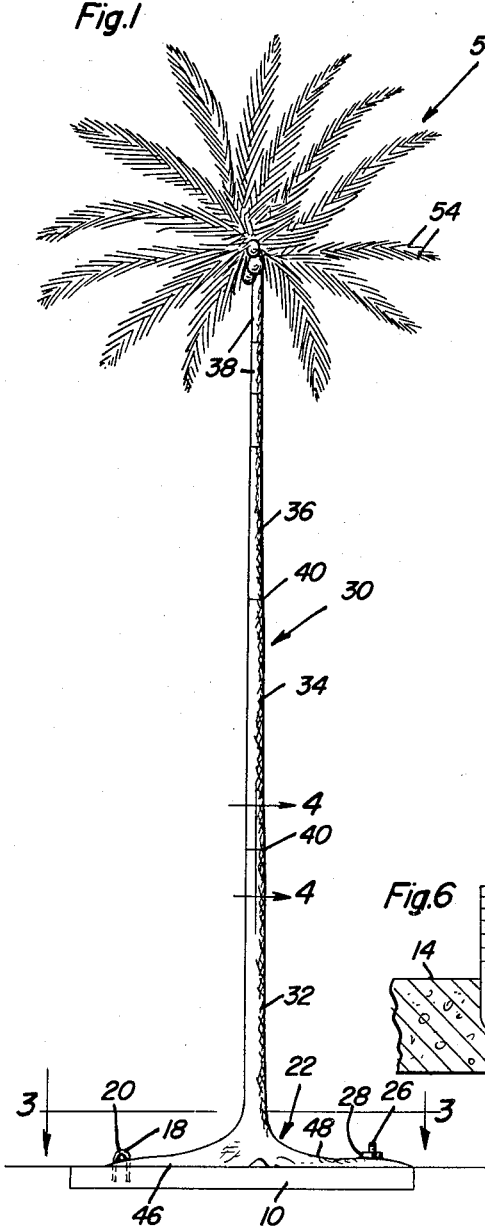
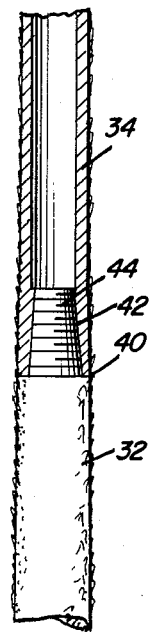
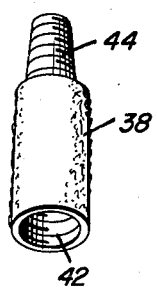
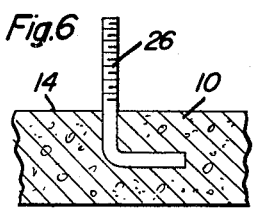
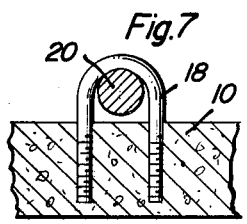
Guy C. Day
INVENTOR.

Aug. 11, 1964          G. C. DAY          3,144,375
ARTIFICIAL TREE
Filed Feb. 24, 1961                    2 Sheets-Sheet 2
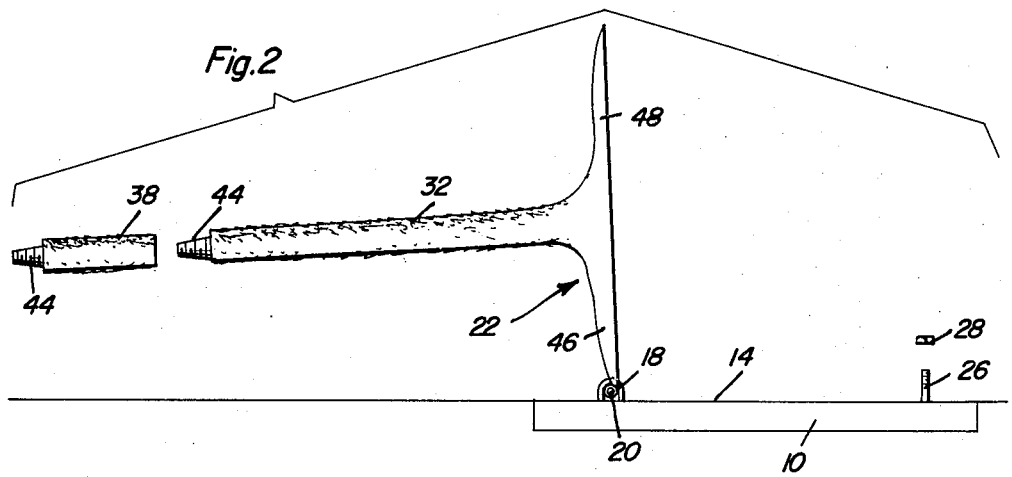
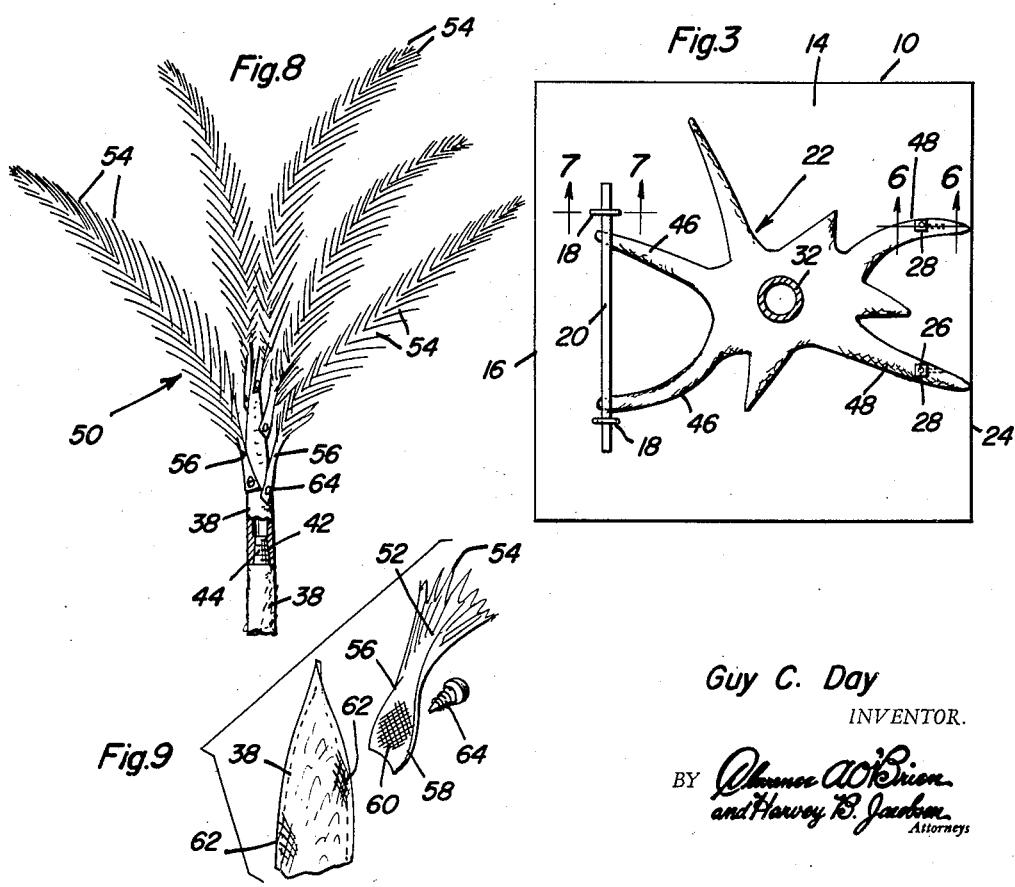
Guy C. Day
INVENTOR.

United States Patent Office 3,144,375
Patented Aug. 11, 1964

3,144,375
ARTIFICIAL TREE
Guy C. Day, Carlsbad, N. Mex.
(203 Pine St., Sweetwater, Tex.)
Filed Feb. 24, 1961, Ser. No. 91,380
3 Claims. (Cl. 161—24)

This invention relates to the art of artificial and imitation trees and has reference, more in particular, to a unique artificial tree which may be used outdoors for beautifying and landscaping home and estate lawns and yards, boulevard margins and center parkways, public park grounds and areas where natural trees are customarily used, and which is equally well adapted for indoor decorative use wherever and whenever desired.

The trend toward accepted use of artificial trees both indoors and outdoors gives rise to a belief that the trend will continue. While the current trend has to do with artificial Christmas trees and indoors imitation plants and the like, there is reasonable evidence which indicates that out-of-doors artificial trees, where they constitute good imitations of live natural trees, will eventually meet with widespread adoption and use. It follows that the instant invention will enable persons in tropical areas to have non-tropical trees, those in non-tropical regions to have and "grow" tropical trees, thus spreading the use of unusual trees regardless of geographical tree-growing limitations. To these ends tree advocates may display and decorate lawns and the like in keeping with individual wishes. For example, one residing in the north may landscape and beautify his ground with tropical palm trees of a selected size (small and "growing" or full-grown) and not have to wait for quick results. By the same token, one residing in the south may likewise "grow" and display trees indigenous to the north, and so on.

An object of the present invention is to devise and commercialize a versatile tree construction which lends itself to practical adoption and use either indoors or outdoors. To the ends desired several objectives are herein revealed. Broadly, an easy-to-handle and install construction has been worked out. For example, the component parts are made from lightweight, but durable and economical sheet metal, chiefly workable aluminum or copper. Instead of the surfaces being shiny or glossy, they are sprayed and coated with colorful long-lasting lacquers, mostly green. But other shades are used where correct imitative results are demanded. Then, too, the skill of the artisan adhering to true representations may be a matter of moment in that size, shape and materials used are prerequisite in prefabrications. For instance, and assuming that the tree desired is a tropical palm having an unbranched columnar trunk topped by a crown of large leaves, the components used in the imitation tree will have to be as duplicative as nearly as possible. With such ideas in view, the tree herein shown (a palm tree) offers a trunk whose bottom section has visible "roots" anchored atop a concrete or an equivalent base giving the desired appearance and effect. The foliage is made of properly formed branches with suitable leaves. The branches are readily attachable. Colors and surface finish are in keeping with expectations, yet the component parts are so made that these prerequisites are attainable.

Another improvement has to do with a trunk which is sectional, the sections being coupled and joined by easily usable male and female joints so that a tree ranging from small to large may be erected.

With the above desires in mind, the concept also comprehends an anchored concrete base or foundation and hinging and retaining means which allows one to unfasten and swing the tree from a vertical to a horizontal position to increase or decrease the trunk's height, to make repairs, and to render the overall construction practical and adaptable to the varying servicing needs encountered.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in elevation of an artificial tree constructed in accordance with the principles of the instant invention and showing the same set up for use;

FIGURE 2 is a view also in side elevation showing the sectional construction of the tree trunk and also showing how the bottom of the tree may be hinged and swung from a normal position to a temporary position with a view toward adjusting the trunk or attending to repairs as the case may be.

FIGURE 3 is a horizontal section on a slightly enlarged scale on the horizontal line 3—3 of FIGURE 1;

FIGURE 4 is a fragmentary enlarged view in section and elevation taken on the vertical section line 4—4 of FIGURE 1;

FIGURE 5 is a perspective view of one of the tree trunk sections;

FIGURES 6 and 7 are enlarged fragmentary views in section and elevation taken on the lines 6—6 and 7—7, respectively, of FIG. 3;

FIGURE 8 is a view in section and elevation showing the top of the tree trunk and the manner in which the leaf-equipped branches of the foliage are constructed and mounted; and, FIGURE 9 is a fragmentary perspective view on a suitably enlarged scale illustrating certain features to be hereinafter described.

By way of introduction to the description of the details it is to be pointed out that the aforementioned tropical palm tree is illustrated in FIGURE 1 as a typical example of any one or all of the imitation or artificial trees herein under consideration. Manifestly, other trees such as maples, oaks, evergreens, etc. are comprehended by the expression "artificial and imitation trees." Furthermore, the mere showing of feathery foliage in FIGURES 1 and 8 is not limiting because the branches may be provided with single and compound leaves whether they be linear, ovate, serrate or of some other delineation. In any event the improved tree is characterized by a self-supporting trunk having spreading branches and constructed and mounted as shown.

In FIGURES 1 and 2 the foundation or base is denoted by the numeral 10. Manifestly, the size and form of the base will vary but it is intended that the base be embedded in the ground or other foundation 12. Also, it is preferably provided with a flat top or upper surface 14 (FIGS. 3, 6 and 7). Continuing with the base it is here shown as of block-like rectangular form and adjacent one marginal edge, the edge 16 in FIG. 3, it is provided with aligned longitudinally spaced staples 18 providing bearings and retainers for an associated rod 20 which rod and staples provide hinging means for that portion of the trunk of the tree referred to as the bottom portion and denoted generally at 22 in FIG. 3. In practice this hinge means is offside, that is, to the left of the vertical axis of the trunk as evident in FIG. 3. The diametrically opposite edge portion 24 is provided with fastening and hold-down means for the bottom portion 22. More specifically, L-shaped studs 26 (FIG. 6) are embedded in the concrete base in spaced-apart relation. The screw-threaded vertical portions serve to accommodate assembling and retaining nuts 28.

Reverting now to the trunk of the tree it is denoted at 30 and it may be of suitable cross-section, exterior finish and height. Under any circumstances it will, of course, be provided with imitation bark or other surface formations as are recognized as characterizing a palm tree on the one hand or oak or other tree on the other hand. This tree trunk is preferably made up of component sections the lower one of which may be 6 feet or so and which is denoted at 32. The next above section 34 is connected thereto and to upper sections 36 and 38 which vary in length. These sections are joined so that the end portions abutt each other as at 40, the seams being nicely finished so that they are hardly visible from a distance. Also, each section is preferably provided at one end with a screw-threaded socket 42 and at the opposite end with a tapering screw-threaded projecting lug 44, these features 42 and 44 defining the aforementioned male and female joint components. These parts will be standardized in actual practice so that the sections will be interchangeable and so that all sections will fit together in keeping with the requirements of any given job.

Referring again to the bottom portion 22 this is an integral part of the lower section 32 and it is made to represent branching artificial roots. The two roots at the left denoted at 46 are connected with the hinge rod or pin 20. The diametrically opposite roots 48 have holes therein (not detailed) to fit down over the studs 26 so as to be held in place when the nuts 28 are applied. It follows that the bolts and nuts provide fastening and hold-down means on the edge 24 and the hinge means at the edge 16 whereby when the fastenings are removed as shown in FIGURE 2 the tree as an entity may be swung down to either lengthen or shorten the trunk or to replace foliage branches, for painting and so on.

It will be evident from FIGURES 8 and 9 that the foliage is denoted as an entity by the numeral 50 and it will vary depending on the tree which is to be represented. Each branch 52 has suitably shaped leaves 54 thereon in keeping with the requirements of a palm tree. The shank 56 at the inner attachable end of the branch is provided with a suitably shaped head 58 which is knurled or milled at 60 to render it rough and to cooperate with the correspondingly knurled or milled attaching point or surface 62 on the tree trunk. These spots 62 will be arranged wherever necessary or desired so that the point of attachment of each limb is reliable and secure. A suitable screw-threaded headed fastener 64 is employed to secure the limb in place.

The limbs are held on the tree by invisible screws or equivalent fastenings and are all of the construction shown in FIG. 9 to cooperate with the roughened attaching spots 62 as is apparently obvious.

The tree is so constructed as to show slow growth or a completely grown tree and the sections of the trunk are made accordingly. Another top may be installed in lieu of the one shown and the interchangeable branches (not shown) would have the construction herein shown and described.

It is believed that a careful consideration of the specification and claims in conjunction with the views of the drawing will enable the reader to obtain a clear and comprehensive understanding of the invention, the features and advantages attending the same, and the preferred ways of utilizing the same. Therefore, a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An artificial tree comprising: a sectional trunk structure having a base simulating root structure, said base being pivotally mounted on a support surface by pivotal connecting means in a manner to permit said sectional trunk to be lowered from a normal upstanding position for access to the trunk sections for adjusting the trunk to a predetermined height, and imitation foliage attached to said trunk.

2. The tree defined in claim 1, and wherein said pivotal connecting means embodies a horizontal anchoring and pivoting rod, said rod being pivotally joined to a pair of relatively fixed staples, and hold-down means releasably cooperable with and diametrically opposed to said rod and normally retaining said trunk in its upstanding position.

3. The structure according to claim 1, and wherein said imitation foliage embodies branches with complemental leaves, the inner attachable ends of said branches having knurled portions detachably fastened on opposed coacting knurled surfaces on the trunk in a manner to increase the holding forces of the fastening means.

References Cited in the file of this patent

UNITED STATES PATENTS

| | | |
|---|---|---|
| 375,378 | Perry | Dec. 27, 1887 |
| 1,266,749 | Abbott | May 21, 1918 |
| 1,412,556 | Earnshaw | Apr. 11, 1922 |
| 1,606,535 | Hojnowski | Nov. 6, 1926 |
| 1,656,310 | Anderson | Jan. 17, 1928 |
| 1,742,720 | Newton | Jan. 7, 1930 |
| 2,251,705 | Gonzalez | Aug. 5, 1941 |
| 2,356,085 | Pfaff | Aug. 15, 1944 |
| 2,889,650 | Hankus | June 9, 1959 |